Sept. 10, 1946.  L. G. DANIELS  2,407,538
AUTOMATIC WATER TREATING DEVICE
Filed Aug. 9, 1941  6 Sheets-Sheet 1

Inventor:
Lee G. Daniels
By
McCanna, Wintercorn & Morsbach
Attys.

Sept. 10, 1946.　　　L. G. DANIELS　　　2,407,538
AUTOMATIC WATER TREATING DEVICE
Filed Aug. 9, 1941　　　6 Sheets-Sheet 2

Inventor:
Lee G. Daniels
By
McCanna, Wintercorn & Morsbach
Attys.

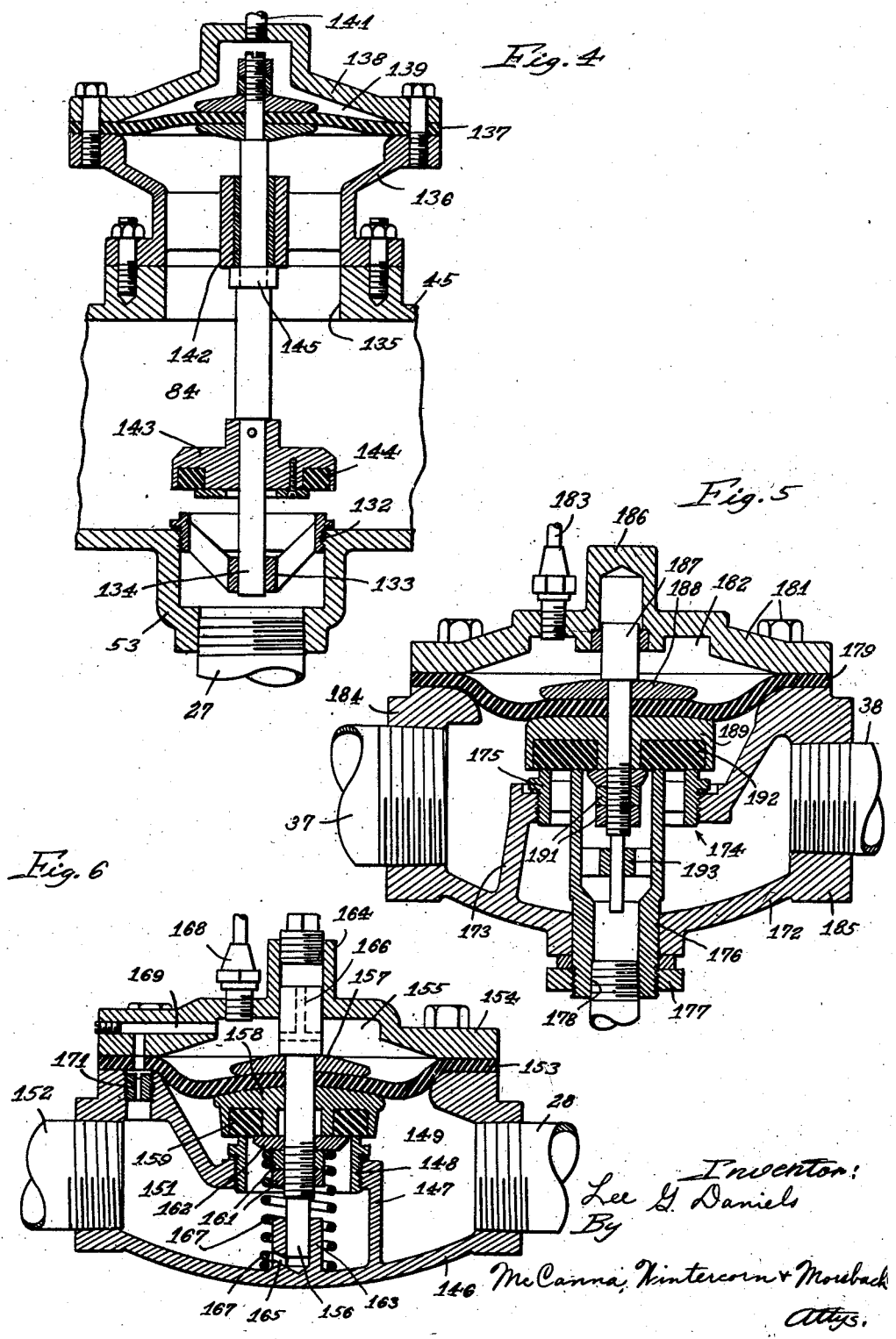

Sept. 10, 1946.  L. G. DANIELS  2,407,538
AUTOMATIC WATER TREATING DEVICE
Filed Aug. 9, 1941  6 Sheets-Sheet 4
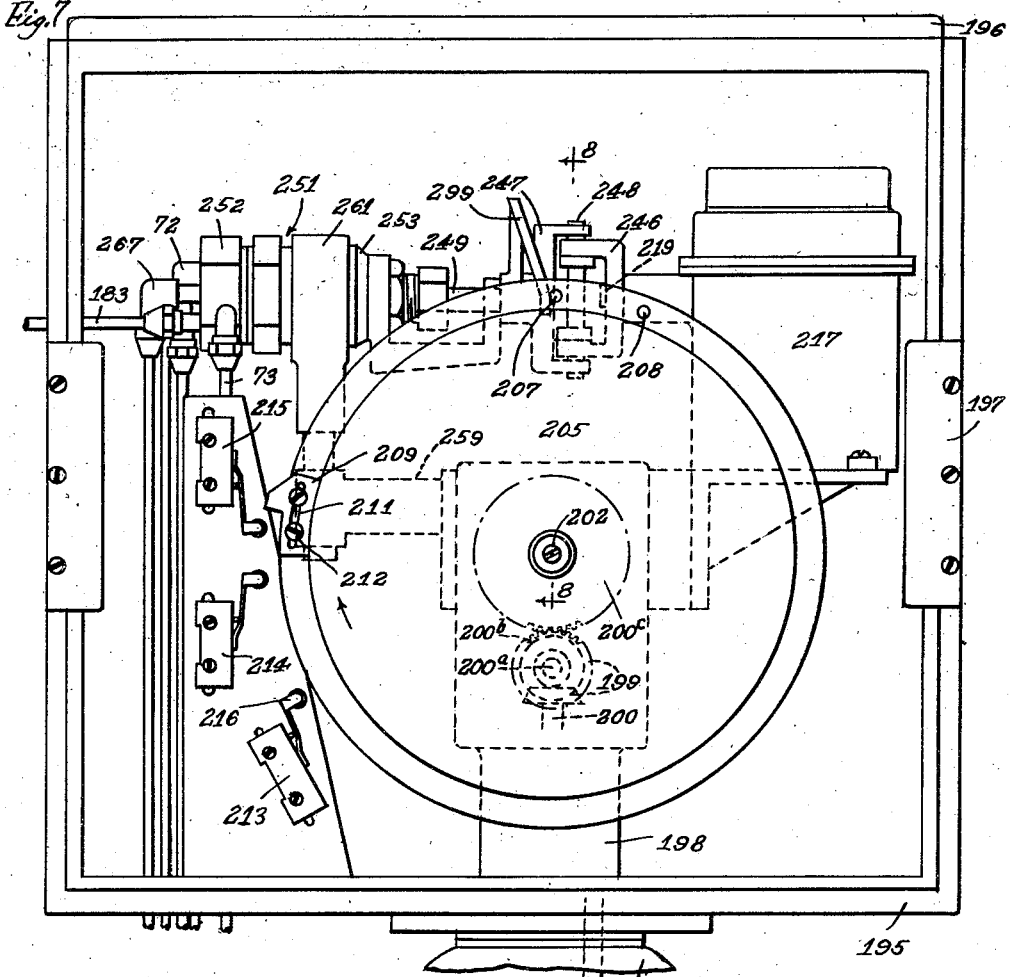
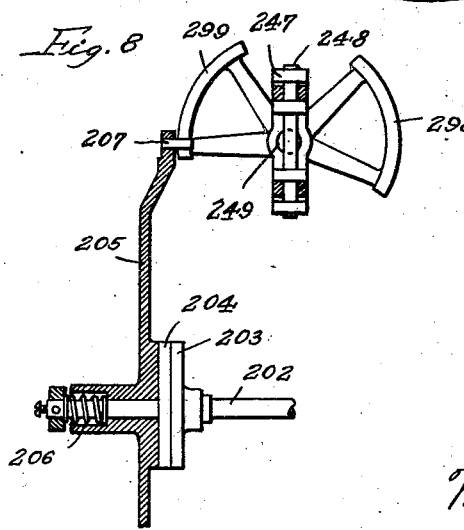
Inventor:
Lee G. Daniels
By
McCanna, Wintercorn & Morsbach
Attys.

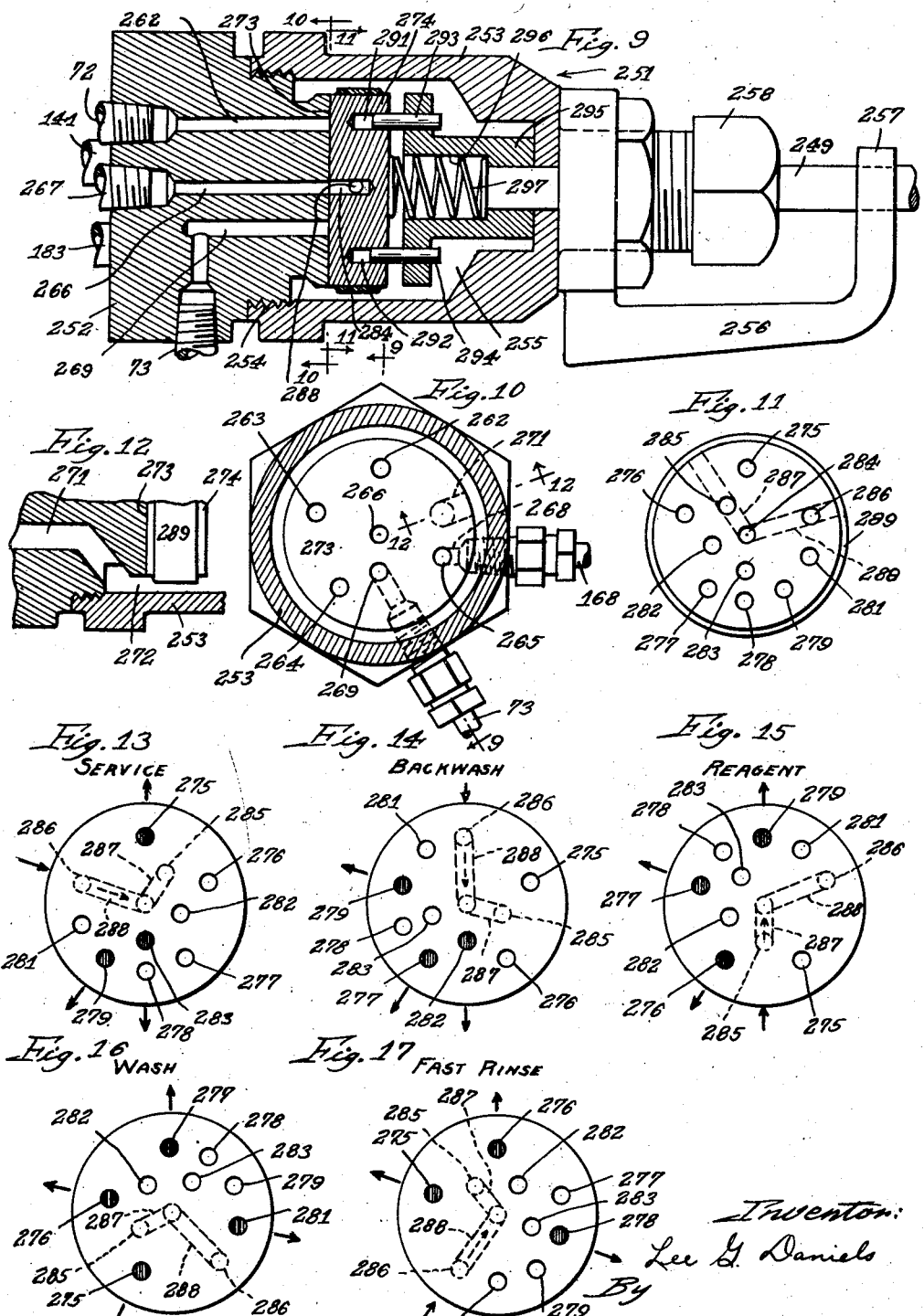

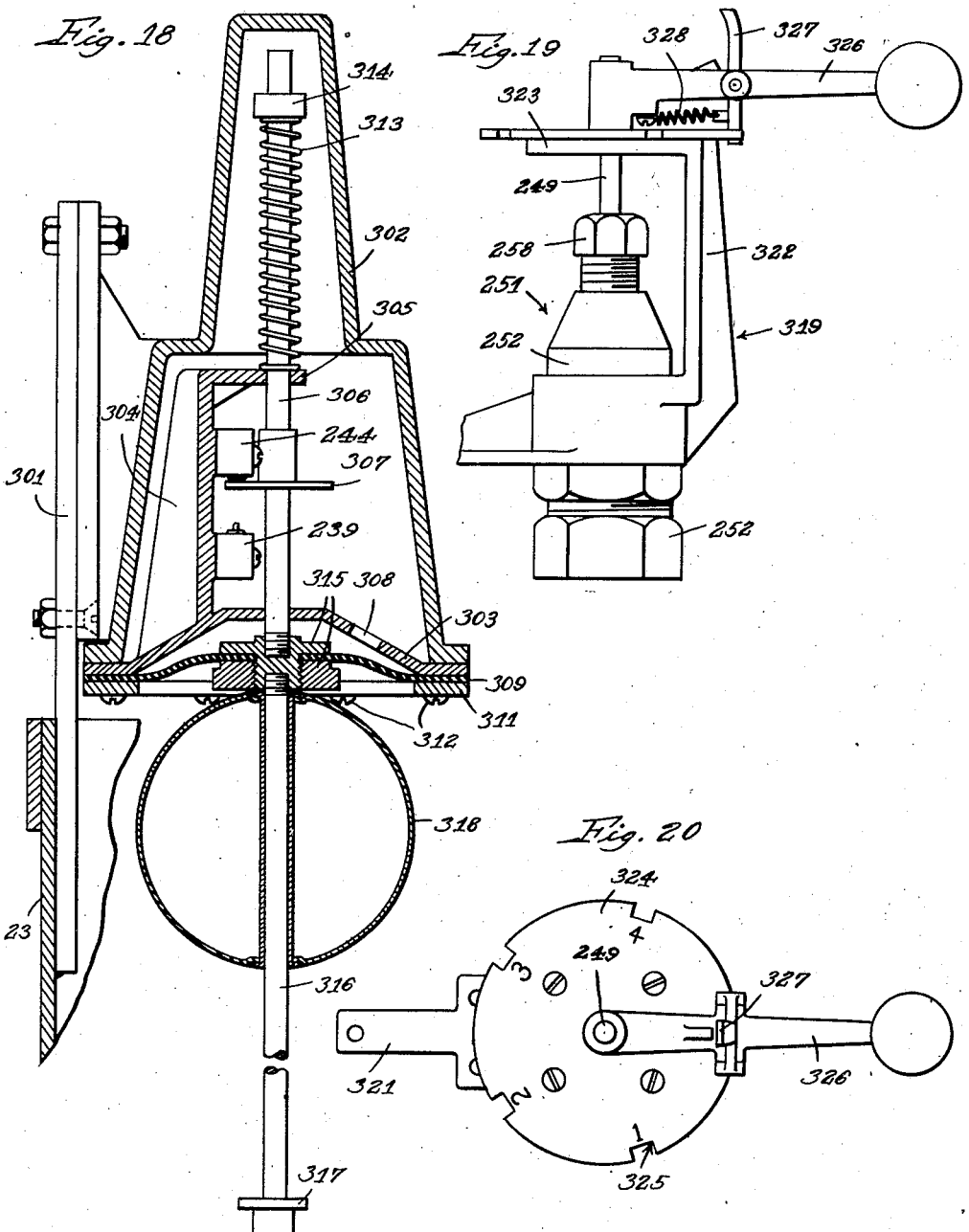

# UNITED STATES PATENT OFFICE 2,407,538

AUTOMATIC WATER TREATING DEVICE

Lee G. Daniels, Rockford, Ill.

Application August 9, 1941, Serial No. 406,188

26 Claims. (Cl. 210—24)

This invention relates to water treatment apparatus and has special reference to a device of the type having a container for holding base exchange or analogous material through which water is passed for the purpose of changing one or more characteristics, and having means for controlling the flow of water and regenerating liquid therethrough for the purpose of regenerating the base exchange material to recondition the same, and to an improved method for regenerating such water treatment apparatus.

In the regeneration of base exchange water softeners and analogous devices, the conventional steps have been to disconnect the flow to service when the mineral becomes exhausted and to reverse the flow so as to back-wash the tank, thereby removing the sediment accumulated during the filtering action of the mineral. Thereafter the brine or other regenerating reagent is passed through the bed in order to recondition the mineral, and the reagent is thereafter washed or rinsed out by passing raw water through the bed. This rinsing is commonly accomplished by passing a flow of water downwardly through the bed until the fluid passing to drain shows an absence of hardness or of the regenerating reagent. Thereafter the valves are rearranged so as to return the softener to service. There is an advantage in a slow injection of regenerating reagent into the treating tank followed by a slow wash because as the reagent solution is passed slowly through the bed of treating material, it provides a longer time for exchange to take place between the regenerating solution and the treating material which reduces the amount of reagent necessary to secure a good regeneration. However, with a slow wash, it is frequently found that the water initially delivered to service, instead of being free of hardness and regenerating reagent as would be anticipated from the test showing that the rinse water was free of such material, may in fact have a certain amount of hardness and reagent. My experience leads me to believe that this is due to the mechanical condition of the bed, which may be caused by failure to back-wash the bed long enough, accumulated silt in the bed, uneven distribution of flow therethrough, or to pocketed spots or small islands formed by masses of the mineral in the bed of a greater density than the surrounding portions of the bed so that the flow of rinse water through these portions is restricted and slower than through other portions of the bed, and consequently the islands are not all properly rinsed free of the regenerating solution during the ordinary rinse operations.

While this after-hardness under many conditions is not serious, under other conditions it leads to complications, as for example, in conventional water softeners where the water must be completely free of hardness and in the so-called hydrogen exchange minerals where either the anion or cation is exchanged, it may lead to serious complications.

An important object of the invention is the provision of a generally improved automatic water treatment device, among the features of which are improved control means for controlling the steps of regeneration and service, improved valve means for controlling the flow therethrough, and an improved cycle of regeneration.

Another object of the invention is the provision in a water treatment device of a valve structure having a plurality of valved ports to waste or drain whereby to materially simplify the valve structure, facilitate the closing of the valve, and assist in retaining the valve in closed position.

A still further object of the invention is the provision of water treatment apparatus in which all of the regeneration steps including the filling or refilling of the reagent or brine tank are completed when the softening, or treating, or service connections are reestablished.

I have also aimed to provide a device of the character described having improved valve means for controlling the flow therethrough through the steps of regeneration and return to service.

A further object of the invention is the provision of a water treatment device having a composite valve provided with a novel chamber and valve arrangement which materially simplifies the valve structure and gives improved operating characteristics.

I have further aimed to provide a water treatment apparatus having novel and improved rinse steps and novel means for controlling the duration thereof during the regeneration operation.

A still further object of the invention is the provision of an automatic water treatment device wherein improved means are provided for controlling the steps of regeneration from a meter.

I have also aimed to provide an automatic water treating apparatus having a meter for controlling certain steps of the regeneration cycle and a level control means in the brine tank for controlling the remaining steps of said cycle.

Another object of the invention is the provision of a device of the character described having valve means for producing a high velocity rinse step and for simultaneously refilling the reagent tank wherein the duration of the high velocity rinse step is measured by the refilling of the reagent tank.

A still further object of the invention is the provision in a device of the character described of novel means for controlling the flow of reagent to the treatment tank.

I have also aimed to provide in a water treatment device, a novel form of hydraulic valve system having a control valve for controlling the movement of the valves, and novel means for actuating and driving the distributor between its various positions.

A further object of the invention is to provide a simple and effective electric control for the regeneration operations in which each circuit is provided with spring switches that are normally spring compressed to a closed position and when released are spring pressed to an open position.

A still further object of the invention is the provision of a water treatment device having a plurality of hydraulically operated valves for controlling the regeneration, and a manually operated control valve for controlling the positions of the valves during the various steps of regeneration and service.

I have also aimed to provide a water treatment apparatus having improved float operated means positioned in the reagent tank, and means for controlling certain steps of the regeneration cycle in response to the position of the float.

A further object of the invention is the provision of an improved and novel method for regenerating a base exchange water treatment device which includes the step of rinsing the base exchange material at high velocity after a preliminary or first rinse operation.

Other objects and advantages will appear from the following description and the accompanying drawings, in which—

Figure 1 is a front elevation of a water treatment apparatus embodying my invention;

Fig. 2 is a wiring diagram showing the electrical portions of the apparatus in diagrammatic form;

Fig. 4 is a fragmentary section on the line 4—4 of Figure 1 through the valve structure shown in Fig. 3 showing the service valve and actuating mechanism;

Fig. 5 is a section through the fast rinse valve;

Fig. 6 is a section through the brine valve;

Fig. 7 is a front elevational view of the control valve, the motor and associated control mechanism;

Fig. 8 is a section on the line 8—8 of Fig. 7 showing the resetting cams;

Fig. 9 is a longitudinal section through the control valve taken substantially on the line 9—9 of Fig. 10;

Fig. 10 is a view taken on the line 10—10 of Fig. 9 showing the face of the stator element;

Fig. 11 is a view on the line 11—11 of Fig. 9 showing the face of the rotor member;

Fig. 12 is a section on the line 12—12 of Fig. 10 showing the pressure inlet to the distributor member;

Figure 3:
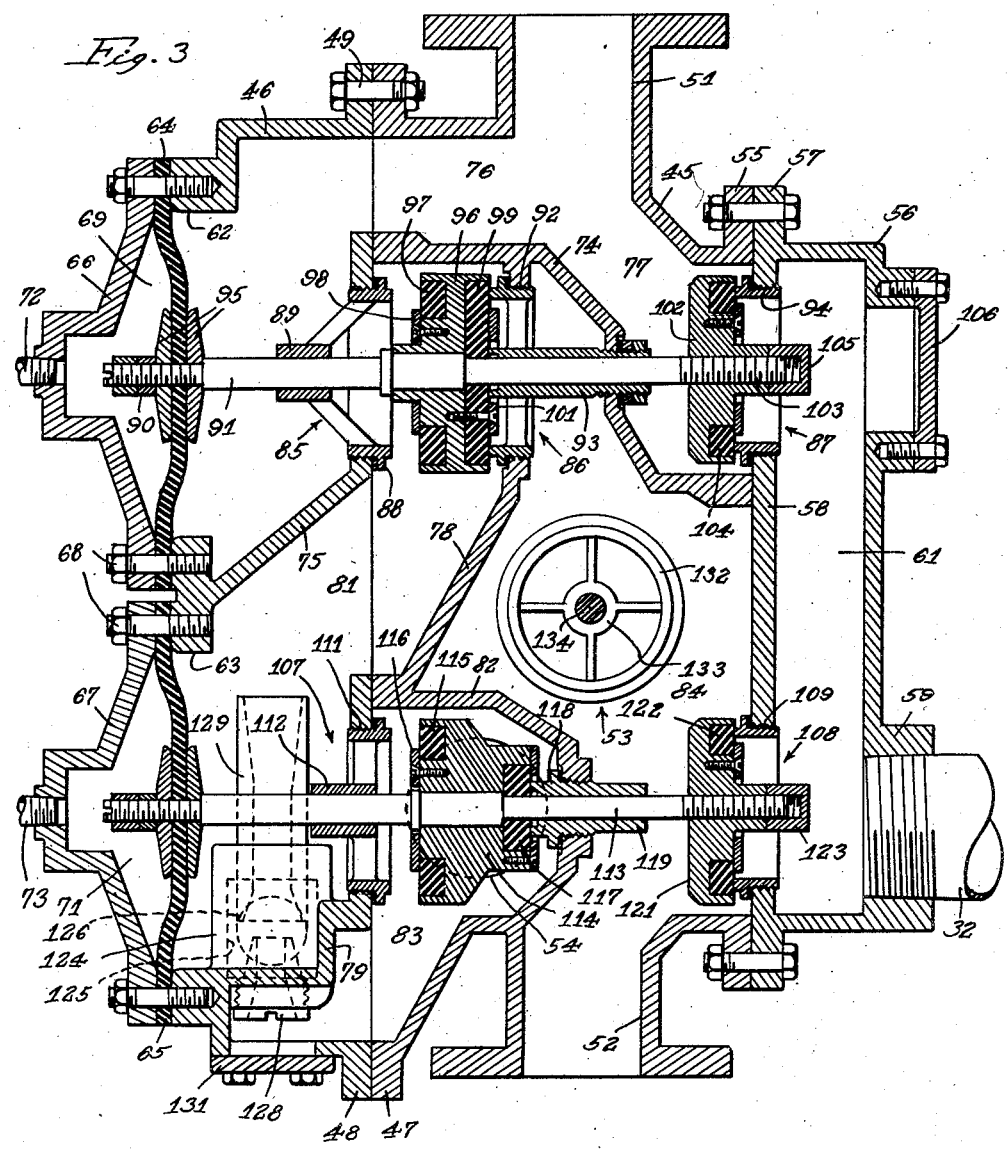
Fig. 3 is a vertical section through a multiple port valve shown in the embodiment of Figure 1.

Figs. 13 to 17, inclusive, are views similar to Fig. 11 showing the positions of the rotor element corresponding to the several steps of the regeneration cycle, the ports shown in cross-section being the open ports and being in communication with the ports of the stator element, these views being diagrammatic in form;

Fig. 18 is a vertical section through the float operated control;

Fig. 19 is a side elevation of the distributor showing manual means for operating the same, and Fig. 20 is an end view of the structure shown in Fig. 19.

Referring now to the drawings, the invention is herein shown as embodied in a zeolite or base exchange water softener, but is equally applicable to devices using other types of water treatment materials requiring similar or analogous regeneration treatment for reconditioning the bed thereof, and which act to change properties of the water in addition to or instead of the hardness thereof, such for example, as the so-called carbonaceous minerals and the like, as well known in the art.

The present embodiment of the invention includes a tank or container 22, in this instance a conventional zeolite water softener or softening or treating tank containing the usual bed of base exchange material and the usual appurtenances for distributing the flow through the bed. Associated with the tank 22 is a reagent or brine tank 23 adapted to hold a supply of regenerating reagent, in this instance the reagent being a conventional brine solution adapted to fill the tank to a level, as indicated at 24. Associated or connected with the tank 22 is a main valve indicated generally by the numeral 25 and shown more in detail in Fig. 3, raw water being supplied to the main valve through a supply or raw water conduit or pipe 26, service or treated or softened water being discharged therefrom through a conduit or pipe 27, reagent or brine being supplied to the valve through a conduit or pipe 28 depending into the reagent or brine tank 23 as shown as 29 and having a portion 31 disposed at the bottom of the reagent tank for the purpose of drawing brine or reagent from the lowermost point of the tank in conformity with conventional practice. A conduit or pipe 32 serves to conduct waste from the valve, the conduit in this instance being disposed to deliver the waste onto the floor about the softener, though this conduit may be directed in such manner as to cause the waste to flow to a receptacle or directly to a sewer or a drain. The main valve 25 also has an upper conduit or pipe 33 connecting the valve to the upper end of the treatment tank 22, and a conduit or pipe 34 connecting the main valve to the lower end of the treatment tank. A reagent valve 35, shown more in detail in Fig. 6, is disposed in the reagent conduit, or pipe, or line 28, the valve in this instance being a hydraulic valve of the diaphragm type and acting to control the flow of reagent through the conduit 28. A fast rinse valve 36 is connected or disposed in branch piping formed by conduits 37, 38 and 39, this branch piping connecting the raw water line 26 with the reagent conduit 28, the connection to the reagent conduit being between the reagent valve 35 and the main valve 25, this valve being shown more in detail in Fig. 5 and serving to control the flow of rinse water to the treatment tank during the second or fast rinse operation, or period, or step. This valve also serves in the filling or refilling of the reagent tank, the valve being connected thereto by a conduit or pipe 41 having disposed therein a flow regenerating or restricting means 42 which is manually adjustable to adjust the rate of flow through the conduit 41. Disposed or connected in the raw water conduit between the pipe 37 and the main valve is a water meter designated generally by the numeral 43 arranged and responsive to the flow of water therethrough to drive or operate or move a control mechanism 44 best shown in Figs. 7 to 17, inclusive, which control mechanism operates, moves, drives, or exercises control functions over the main valve 25, the reagent valve 35, and the accelerated or fast rinse valve 36 to move, operate, drive, or actuate the same through the operation, position, or steps of regeneration and return to the softening, treating, or service position or operation.

The main valve 25 constituting the main fluid distribution unit, shown more in detail in Figs. 3 and 4 is, in this instance, a multiple port reciprocating type valve actuated by means of fluid pressure, though the control mechanism is also suitable for the control of single hydraulic valves as well as other types. The valve 25 includes a housing formed of three sections designated generally by the numerals 45, 46 and 56, the sections 45 and 46 being secured together by flanges 47 and 48 and bolts 49 spaced annularly of the flanges. The sections are thus secured together to form a plurality of chambers or passageways for the flow of liquid between the various conduits connected to the valve. The section 45 has a pipe connection 51 for connection to the conduit 33 leading to the top of the softener, a pipe connection 52 connected to the conduit 34 leading to the bottom of the softener, a pipe connection at 53 connected to the service line 27, and a pipe connection at 54 to which the raw water supply conduit 26 is connected. The valve section 45 has a flange 55 on the side thereof opposite the flange 47 to which the manifold member 56 is attached by means of a flange 57, the manifold member having an inner wall 58 which serves as one wall of various chambers within the valve casing. The manifold 56 has a pipe connection 59 to which the waste pipe or conduit 32 is connected, communicating with a chamber 61 within the manifold which forms part of the waste pipe or conduit for conducting the waste water from the valve.

The side of the section 46 opposed to the section 45 is provided with openings 62 and 63 across which are disposed diaphragm members 64 and 65 secured thereto by caps 66 and 67 and screws 68 spaced annularly of the caps, the caps being disposed outwardly from the plane of the opening to form liquid chambers 69 and 71 for actuation of the diaphragms to the right facing Fig. 3. Conduits 72 and 73 communicate with the chambers 69 and 71 for the purpose of supplying pressure liquid for the actuation of the diaphragms, as will presently be described.

The section 45 has a transverse partition 74 which joins a transverse partition 75 of section 46 to form communicating chambers 76 and 77 connected with the upper end of the softener, and hereinafter being referred to as the upper chamber. The transverse partition 75 cooperates with a transverse partition 78 of section 45 and with a partition 79 of section 46 to form an intermediate chamber 81. The partition 79 cooperates with a partition 82 of the section 45 to form an inlet chamber 83, and the partitions 74, 78 and 82 and the wall 58 cooperate to form an outlet chamber 84 communicating with the pipe connection 52 to the bottom of the softener. Valve ports 85, 86 and 87 are provided in the walls 75, 78 and 58, respectively, the port 85 connecting the upper or end chamber 76 and the intermediate chamber 81, the port 86 connecting the intermediate chamber 81 and the outlet chamber 84, and the port 87 connecting the upper chamber 76 with the manifold chamber 61. The port 85 has a valve seat 88 threaded into the wall 75, the seat having a spider supporting a guide 89 for supporting and guiding a valve stem 91. The port 86 likewise has a valve seat 92 threaded into the wall 78 and having a spider carrying a guide 93 for the stem 91, the guide 93 passing through the partition 74. The port 87 also has a valve seat 94 threaded into the wall 58.

The stem 91 has one end supported in the diaphragm 64, the stem passing through washers 95 disposed on opposite sides of the diaphragm and secured thereto by nuts 90 threaded onto the end of the stem and confining the washers and diaphragm between the nut and shoulder. Attached to the stem 91 between the ports 85 and 86 is a disk holder or valve member 96. The disk holder 96 is fixedly carried on the stem and supports a disk 97 on one face for cooperation with the valve seat 88, the disk 97 being formed of thick resilient material such as relatively soft rubber in which the seat 88 will be impressed to produce a seal therebetween. In this instance the disk 97 is secured against the disk holder by a ring 98 engaging the outer face of the disk. The opposite side of the disk holder 96 carries a disk 99 of thick resilient rubber secured thereto by means of an annular ring and screws 101, the disk 99 being adapted to produce sealing contact with the seat 92 in the opposed position of the stem. Attached to the stem 91 adjacent the port 87 is a disk holder or valve member 102 having a threaded bore for screw thread engagement with the threaded end of the stem as shown at 103. The disk holder 102 likewise carries a disk 104 of thick soft and resilient rubber adapted to contact the seat 94 at the same time as the disk 99 contacts the seat 92. The disk holder 102 and the end of the stem 91 have such threaded engagement that by rotating the disk holder the relative position of this disk holder with respect to the holder 96 can be adjusted so as to cause simultaneous seating of the disks 99 and 104. The disk holder 102 is held in its adjusted position by means of a cap 105 threaded over the end of the stem so as to lock the disk holder in position and simultaneously seal the disk holder with respect to the stem so as to prevent the egress of liquid therethrough under the operating pressure of the valve. A removable plate 106 is provided on the manifold 56 to facilitate adjustment of the disk holder. As previously described, fluid is admitted under pressure through the tube 72 into the chamber 69 in order to move the valve disks 99 and 104 to the closed position as shown in Fig. 3, whereas release of fluid from the chamber 69 brings about opening of the ports 86 and 87 and closing of the port 85 in response to movement of the diaphragm toward the left facing Fig. 3 occasioned by the pressure of the liquid in the chamber 76, thereby controlling the flow through the ports 85, 86 and 87.

Positioned in the transverse partition 79 and in the wall 58 are valved ports 107 and 108, the port 108 having a seat 109 threaded into the wall 58 in axial alignment with a seat 111 threaded into the port 107, the seat 111 having a spider carrying a stem support 112 through which a valve stem 113 passes. One end of the stem 113 is attached to the diaphragm 65 in the same manner as described with respect to the stem 91. Positioned on the stem 113 within the inlet chamber 83 is a disk carrier or valve member 114 having a thick disk 115 of resilient rubber seated thereon opposite the seat 111 and secured by means of a ring 116 and adapted to contact the seat 111 when the stem occupies a leftwardly disposed position viewing Fig. 3, to which position the stem is moved in response to pressure in the intermediate chamber 81. On the opposite side of the disk carrier 114 is a disk 117 of relatively thick resilient rubber adapted to contact a seat 118 carried on a sleeve 119 through which the stem 113 passes and which serves as a support for the stem, the seat 118 and disk 117 serving to seal the interface around the stem in the normal service position of the valve. A disk carrier or valve member 121 similar to the disk carrier 102 is threaded onto the end of the stem 113 in an identical manner and carries a thick resilient disk 122 adapted to bear against the seat 109 when the stem occupies its position to the right as shown in Fig. 3 to seal the port 108, the stem having a cap 123 identical with the cap 105 and serving a similar purpose, the disk carrier being adjustable through pipe connection 59. Here again the disk carrier 121 is adjustable on the stem so as to cause the disks 117 and 122 to seat simultaneously as the stem moves toward the right.

The valve disks 97, 99, 104, 115, 117 and 122 are formed as explained, of thick resilient rubber or the like, the resilience and the thickness thereof being such that relatively small maladjustment of the positions or alignment thereof will be taken up when seated by differences in the degree to which the disks are compressed.

An enclosing wall 124 positioned against the transverse partition 79 within the intermediate chamber 81 forms an injector chamber 125 having a pipe connection 126 for connection to the reagent conduit 28 as indicated at 127 (Figure 1). Positioned in the wall of the transverse partition 79 is an injector nozzle 128 arranged to discharge liquid from the inlet chamber 83 through the injector chamber 125 and into a Venturi tube 129, the tube 129 extending through the enclosing wall 124 and into the intermediate chamber 81 so as to discharge the flow of liquid through the nozzle 128 and the flow through the pipe connection 126 into the intermediate chamber 81 in a combined flow. A removable cap 131 on the housing section 46 provides access to the injector.

Referring now to Figs. 3 and 4, flow through the pipe connection 53 to the service line is controlled by a valve such as shown in Fig. 4, of section 45, having a valve seat 132 positioned therein at the pipe connection 53, the seat carrying a guide 133 for guiding a valve stem 134. The stem 134 passes through an opening 135 in the section 45, the opening being enclosed by an upstanding flange 136 against the outer face of which is a diaphragm 137 over which is seated a cap 138 similar to the caps 66 and 67, providing a pressure fluid chamber 139 to which fluid pressure is supplied and exhausted through a tube 141. The flange has a web supporting a stem guide 142 through which the stem 134 passes, the opposite end of the stem being secured to the diaphragm 137 in the manner heretofore described in connection with the diaphragm 64. It will be seen that the opening 135 provides access of the fluid within the valve to the lower side of the diaphragm 137 to supply fluid pressure to this side of the diaphragm and thereby move the stem and diaphragm to an upper position facing Fig. 4 when pressure is exhausted from the chamber 139 so as to open the valve. The stem 134 carries a disk holder 143 upon which is supported a relatively thick resilient disk 144 adapted to contact the valve seat 132 in the closed position of the valve. A collar or equivalent device 145 is provided on the stem adapted to abut against the guide 142 to limit the open position of the valve.

All of the liquid entering and leaving the treatment tank 22 passes through the main valve 25. During the service position of the valve, raw water enters from the conduit 26 and the connection 54 into the inlet chamber 83. The stems 91 and 113 being shown in the service position of the valve, with pressure applied to the chambers 71 and 69, raw water passes through the port 107 and through the injector nozzle 128 and tube 129 into the intermediate chamber 81 and thence through the port 85, the chamber 76, and the conduit 33 to the top of the treatment tank. The valves 35 and 36 are closed, as will presently be described, when the main valve 25 occupies the service position. The treated or softened water emerges from the treatment tank to the conduit 34, passing through the connection 52, chamber 84 and connection 53 to the service line 27. When regeneration of the mineral in the treatment tank is required, the fluid pressure is exhausted from the chamber 69, whereupon the pressure of the water in the chamber 76 acts on the diaphragm 64 moving the stem 91 to the left facing Fig. 3 until the disk 97 contacts the valve seat 88 sealing the port 85. Simultaneously flow through the service pipe 27 is terminated by the application of fluid pressure to the chamber 139 (Fig. 4) bringing the valve disk 144 into sealing contact with the seat 132. In this position of the valve raw water flows from the chamber 83 through the port 107 and the injector into the intermediate chamber 81, thence through the port 86, the chamber 84, the connection 52 and the conduit 34 to the bottom of the treatment tank and out from the top of the treatment tank through the conduit 33, the connection 51 and chamber 77 through the waste port 87 and manifold chamber 61 into the waste conduit 32, thus producing a back-wash step in the regeneration cycle. When the treatment tank has been backwashed to the desired degree, pressure is reapplied to the chamber 69 causing the stem to move back to the position shown in Fig. 3, pressure is retained in the chamber 139 (Fig. 4) so as to retain the service valve closed, and pressure is exhausted from the chamber 71, whereby the pressure of the water in the intermediate chamber 81 acts against the diaphragm 65 moving the stem 113 to the left facing Fig. 3 until the disk 115 comes into sealing contact with the seat 111. This movement of the stem simultaneously opens the port 108. Water then flows from the inlet chamber 83 through the injector nozzle 128 and into the injector Venturi tube 129, sucking reagent from the reagent conduit 28 by way of the pipe connection 126, the reagent and water entering the intermediate chamber 81 in a combined flow, and thence passing through the port 85, chamber 76 and conduit 33 to the top of the treatment tank. The spent reagent passes out of the bottom of the reagent tank through the conduit 34 and chamber 84, through the drain or waste port 108 and manifold chamber 61 into the waste conduit 32. This step continues until the requisite quantity of regeneration reagent has been introduced into the treatment tank whereupon, by means presently to be described, the flow of reagent through the conduit 28 is terminated. Upon termination of the flow of reagent, water continues to flow through the injector and treatment tank along the path last above described until the treatment tank has been washed free of spent reagent and is ready to be returned to service, whereupon pressure is re-applied to the diaphragm chamber 71 to return the stem 113 to the position shown in Fig. 3, and pressure is exhausted from the diaphragm 139 (Fig. 4) so that the pressure of the water in the chamber 84 acting on the diaphragm 137 moves the valve disk 144 to the open position, thus reestablishing the flow to service and completing the regeneration cycle.

The valve controlling the flow of regenerating solution from the reagent tank 23 to the main valve by way of the pipe 29 is best shown in Fig. 6. The brine valve 35 has a body designated generally by the numeral 146, the body having a transverse partition 147 provided with a port within which is a valve seat 148, the partition dividing the valve into incoming and outgoing chambers 149 and 151, respectively, the chamber 149 being disposed toward the regenerating solution tank and the chamber 151 being connected to the main valve through a conduit 152. Disposed across the top of the body 146 is a diaphragm 153 exposed on its lower side to the fluid within the chamber 149, the diaphragm being covered by a cap 154 providing a diaphragm chamber 155 on the side of the diaphragm opposite the chamber 149. A valve stem 156 passes through the diaphragm 153 and has disposed thereon a washer 157 seated against the top of the diaphragm and held thereagainst by a shoulder on the stem. The stem also carries a disk carrier 158 disposed against the bottom side of the diaphragm and carrying a relatively thick resilient valve disk 159 adapted to engage the seat 148 to effect sealing contact thereagainst. The washer 157, the diaphragm and the disk carrier are urged together by nuts 161 engaging a threaded portion of the stem 156 and urging these parts together with a washer 162 into relatively fixed relationship. The lower end of the stem 156 is guided in a boss 163 and the upper end thereof is guided in a boss 164 formed in the cap 154. The boss 163 has a vent opening 165 whereas the upper end of the stem likewise has a vent opening 166 to vent water from the interior of the bosses as the stem reciprocates. The stem is normally urged to the open position of the valve by means of a spring 167 enclosing the stem and acting between the disk carrier 158 and the valve body 146. A tube 168 is connected with the diaphragm chamber 155 for the purpose of supplying pressure fluid thereto, and the diaphragm chamber 155 is connected with the valve chamber 151 by means of a channel or bore 169 and a restriction plug 171, the restriction plug having a bore substantially smaller than the bore of the tube 168 so that the tube 168 is capable of supplying pressure fluid to the chamber 155 at a substantially greater rate than the fluid can flow through the restriction plug 171.

In operation it will be seen that the valve 35 is connected so that the conduit 152 is connected to the intake side of the injector in the main valve, and consequently when the main valve is moved to the position to inject reagent into the treatment tank, the liquid is sucked from the conduit 152 and the chamber 151 creating therein a pressure substantially less than atmospheric. At the time the main valve is moved to a position to inject reagent into the treatment tank, pressure is relieved from the diaphragm chamber 155. This removal of the pressure from the chamber together with the reduced pressure in the chamber 151 and the open connection between the diaphragm chamber 155 and the chamber 151 by way of the restriction plug 171 permits the valve to open under the action of the spring 167. Regeneration fluid continues to flow through the valve until the requisite quantity of regeneration liquid has been supplied to the treatment tank, whereupon pressure is applied to the chamber 155 through the tube 168 to close the valve against the pressure of the spring 167. Thereafter a small quantity of pressure fluid will flow from the chamber 155 through the restriction plug 171 and thence to the injector, but since rinse water is flowing through the injector to the tank, this flow of water will not be objectionable, the amount of this flow being substantially less than that supplied by the tube 168 so that the pressure in the diaphragm chamber is substantially maintained and the valve is held closed.

The structure of the valve 36, which I have termed for purpose of convenience as a fast rinse valve, is shown in Fig. 5. This valve includes a body member 172 having a partition 173 provided with a valved port 174 into which is threaded a valve seat 175, the valve seat having a spider supporting a tube 176, the tube extending through the wall of the body and being attached and sealed thereto by a packing and nut 177 or other convenient means. The tube is internally threaded as shown at 178 for the reception of the conduit 41 leading to the reagent tank and serves in the refilling of the reagent tank. A diaphragm 179 is disposed across the top of the body 172 and is secured thereto by a cap and screws 181 providing a diaphragm chamber 182 above the diaphragm, a tube 183 communicating therewith for the purpose of supplying pressure fluid. The body 172 has pipe connections 184 and 185 adapted to receive the conduits 37 and 38, respectively, so that the lower side of the diaphragm 179 is subjected to the pressure of the raw water entering the valve. The cap 181 has a boss 186 serving to guide the upper end of a valve stem 187 which passes through the diaphragm and through a washer 188 and disk carrier 189, the washer, diaphragm and disk carrier being confined between a shoulder on the stem and nuts 191 threaded onto the stem to maintain the parts in fixed fluid-tight relationship. The disk carrier 189 has a thick resilient disk 192 adapted to seat against the valve seat 175 and against the end of the tube 176 to seal the same. The lower end of the valve stem is guided in a stem guide 193 supported on a web in the tube 176.

Pressure is normally applied in the diaphragm chamber 182 through the tube 183 so as to hold the valve closed and prevent flow through the conduits 38 and 41. However, control means, presently to be described, are provided for relieving the pressure on the tube 183 and the chamber 182 at a predetermined point in the rinse step so that the valve 36 is open in response to pressure of the raw water on the lower side of the diaphragm 179. Thereupon raw water flows through the valve and through the conduits 38 and 39 to the conduit 152 connecting the brine valve 35 and the injector so that the flow into the intermediate chamber 81 of the main valve is made up by the flow through the nozzle 128 plus the flow through the conduits 38, 39 and 152, thereby greatly accelerating the flow of rinse water through the treatment tank. It will be seen that simultaneously raw water flows through the tube 176 of the valve 36 into the conduit 41 and thence to the reagent tank 23 through the restriction valve 42. The restriction valve 42 is of conventional form having a valve plug provided with a hexagonal head 194 or similar means requiring a wrench for its adjustment, the position of this valve determining the rate of flow through the pipe 41 and consequently the length of time required to refill the treatment tank. The rate of flow through this restriction valve is used for the purpose of regulating the duration of the fast rinse step, as will presently more fully appear.

The control mechanism 44 is shown more in detail in Fig. 7 and includes an enclosing housing 195, in this instance having a glass panel 196 secured across the front thereof by means of guides 197 adapted to permit raising of the panel for access to the interior of the housing. In this instance the housing is shown as directly mounted on the meter 43, but obviously it may be otherwise mounted if desired. The meter 43 has a conventional gear casing 198 disposed thereon and containing the conventional gears driven from a shaft 201, for driving a shaft 200 which in turn drives beveled gears indicated at 199 which drive a pin 200a, this pin driving through spur gears 200b and 200c to drive a shaft 202 projecting from the gear housing, the shaft 202 having a friction clutch element 203 fixed thereon for engagement by a friction clutch element 204 carried on a cam carrying disk 205 rotatable on the shaft and functioning as an actuator, the disk and friction element 204 being carried on the shaft 202 and urged into engagement with the friction element 203 by a spring 206. Positioned on the back of the disk 205 are spaced pins 207 and 208 projecting rearwardly therefrom for a purpose presently to be described, and on the forward face of the disk is a cam member 209 projecting from the periphery of the disk and secured thereto by a slot 211 and screws 212 arranged to permit limited adjustment of the position of the cam member peripherally on the disk. Spaced peripherally of the disk are switches 213, 214 and 215 having roller and lever actuating members as shown at 216 disposed in the path of the cam member 209 so that as the disk rotates under the action of the meter, the switches 213, 214 and 215 will be actuated or closed in succession to complete a circuit, the switches being spring pressed to open position. Each switch 213, 214, and 215, which I term a "starting switch" has a spring contact arm connected at one end to an electrical conductor, and a stationary contact connected to the opposite conductor. The contacts are closed when the spring arm is compressed to a closed position and when released it is spring pressed to an open position in which the contacts are open. These switches are of the so-called precision type, such as marketed under the trade-mark Micro switch, and manufactured by Micro Switch Corporation, Freeport, Illinois. The switches 213, 214, and 215 exercise control over a program motor designated generally by the numeral 217 in the manner shown in Fig. 2, wherein the motor and associated parts are shown in diagrammatic form, the numeral 218 designating the motor proper which acts to drive a shaft 219 carrying a plurality of cams 221, 222, 223, 224 and 225 which serve to actuate or close switches 226, 227, 228, 229 and 231 which I term "stopping switches" and are spring pressed to an open position and exercising control over the circuit of the motor 218 to cause the motor 218 to index the shaft 219 through a predetermined angularity upon each closing of the circuit and then to stop the motor, the angularity in this instance being 72° in each instance. These stopping switches are similar in construction to the starting switches above described. Thus, when the disk 205 rotates in a clockwise direction from the position shown in Fig. 7 until the cam member 209 contacts the roller lever 216 closing the switch 213 representing the end of the service period, the switch 213 is closed, completing a circuit from a power line 232 by way of conductor 233, switch 213, conductor 234, switch 226, and conductor 235 to the motor 218 and thence to the power line 236 causing the motor to index the shaft 219 until the switch 226 is spring pressed to open when released by dropping off the elevated portion of cam 221, thus moving control means presently to be described to move the valves to the backwash position. During each indexing of the shaft 219 one of the cams thereon closes the next succeeding stopping switch. Likewise continued rotation of the disk 205 next causes closing of the switch 214 which completes circuit to the motor 218 by way of the power line 232, conductor 237, switch 214, conductor 238, switch 227, and conductor 235 to the motor, and thence to power line 236, whereupon the shaft 218 is indexed through a further 72° until the switch 227 is opened by action of cam 222. This rotation of the shaft 219 closes switch 228, but the circuit containing the same is open at a switch 239 (Figs. 2 and 18) controlled in response to the level of liquid in the reagent tank. When the switch 239 is closed in response to the level of the liquid in the reagent tank reaching a predetermined lower point, the motor is energized to rotate the shaft 219 through a further 72° by the closing of the switch 239 through a circuit including conductors 232, switch 239, a conductor 241, switch 228 and conductor 235 to the motor, and thence to power line 236, the shaft rotating through a further 72° or until the switch 228 is opened by action of the cam 223. This rotation of the shaft also closes switch 229. Action of the cam 209 on the meter disk 205 subsequently closes switch 215, again energizing the motor by way of conductors 232, 237, a conductor 242, switch 215, a conductor 243, switch 229 and conductor 235 to the motor 218, and thence to power lead 236. The shaft 219 is then rotated through a further angularity of 72°, the operation of the motor being interrupted by opening of the switch 229 in response to rotation of the cam 224. Simultaneously, cam 225 causes closing of the switch 231 establishing a new circuit to the motor which at this time is open at a switch 244 (Figs. 2 and 18), which switch is operated in response to the level of liquid in the reagent tank reaching a predetermined high point. Closing of the switch 244 again initiates operation of the motor 218 by way of conductor 232, a conductor 245, switch 244, switch 231 and conductor 235 to the motor, and thence to the power lead 236, causing the motor to index the shaft 219 through a further angularity of 72° and returning the parts to the service position shown in Fig. 2. The switches 239 and 244 are starting switches and are similar in construction to the starting switches 213, 214, and 215.

These indexing operations of the shaft 219 are employed to control the various steps or operations, or positions of the regeneration cycle, the shaft 219 being disposed to drive a suitable flexible joint, in this instance including a yoke 246 carried on the shaft 219 and driving a yoke 247 through a pivot pin connection 248 (Fig. 7). The yoke 247 is attached to the spindle or stem 249 of a rotary multiple port control valve designated generally by numeral 251.

The control valve 251 is shown in section in Fig. 9 and includes a stator element 252 having a cap 253 threaded thereon as shown at 254, the cap being recessed to provide a chamber 255 therein. The cap has an arm 256 projecting beyond the end thereof to provide lateral support for the spindle 249 as shown at 257, and the spindle passes through a conventional stuffing box as shown at 258 to prevent the egress of fluid along the spindle. The distributor member is supported on the gear housing 198 of the meter by means of a bracket 259 and sleeve 261, which sleeve surrounds the cap 253 as best shown in Fig. 7. The stator element 252 is provided with ports 262, 263, 264 and 265 arranged on the same radius, and a central port 266, the ports 262, 263 and 264 extending completely through the stator and connected to certain of the diaphragm chambers, the port 262 being connected by means of the tube 72 to the diaphragm chamber 69 of the main valve, the port 263 being connected by the tube 141 to the diaphragm chamber 139 of the main valve, the port 264 being connected by tube 183 to the diaphragm chamber 182 of the fast rinse valve 36. The port 266 is connected by a tube 267 to drain and acts to conduct the pressure fluid to drain in releasing the operating pressure on the diaphragms. The port 265 extends partway through the stator member and then laterally outward as shown at 268 and is connected by tube 168 to the diaphragm chamber 155 of the brine valve 35. The stator also has a port 269 on a radius somewhat less than that of the ports heretofore mentioned, which port extends partway through the stator member and then laterally outward, and is connected by means of the tube 73 to the diaphragm chamber 71 of the main valve. The stator element 252 has a further bore or channel 271 (Fig. 12) which opens into the chamber 255 adjacent the periphery thereof as shown at 272 to supply liquid under pressure from conduit 26 by way of a tube 270 (Figure 1) to the interior of the chamber 255, the liquid conveniently in this instance being water which enters through the channel 271 and moves outwardly into the chamber around the periphery of a raised seat face 273 through which the various ports extend.

Positioned in face contact with the seat 273 of the stator is a rotor 274 best shown in Figs. 9 and 11, the rotor in this instance being a relatively thick flat circular disk. The rotor has a plurality of ports which extend completely through the rotor parallel to the axis identified by the numerals 275, 276, 277, 278, 279, 281, 282 and 283, the ports 275 through 281 being arranged on the same radius as the ports 262, 263, 264 and 265 of the stator so as to establish communication therewith in various rotative positions of the rotor while the ports 282 and 283 are arranged on the same radius as the port 269 of the stator. The disk has a central drain or waste port 284 extending partway through the disk so as to establish continuous communication with the central port 266 of the stator. Additional ports 285 and 286 are provided, the port 285 being on the same radius as the ports 282 and 283, and the port 286 being on the same radius as the ports 275 to 281. These ports pass only partway through the rotor and intersect radially disposed channels 287 and 288 joining the port 284 intermediate the opposed faces of the rotor, the ports 285 and 286 thus serving to establish communication between the various ports of the stator and the drain port 284. The channels 287 and 288 are in this instance formed by bores extending radially inward from the periphery of the rotor, the outer ends of the bores being closed by a band 289 which encircles the periphery of the rotor and may be pressed thereon and welded or soldered in position to close the outer ends of the channels. The rotor is also provided with holes 291 and 292 extending into the face thereof opposite the contacting face for the reception of pins 293 and 294 carried in a flange member 295 attached within the chamber 255 to the end of the spindle 249, the pins and flange member serving to transmit rotation from the spindle to the rotor. The flange member 295 is chambered as shown at 296 and carries a spring 297 which acts between the end of the chamber 296 and the outer face of the rotor to urge the same against the face of the stator and hold it into operative relationship therewith.

The rotor 274, being connected to the spindle 249 for rotary motion therewith is thus moved in step fashion through successive angularities of 72° in response to rotation of the shaft 219, the steps corresponding to the steps of the regeneration and service cycle and the ports in the stator and the rotor are so arranged as to apply and relieve pressure fluid to the diaphragm chambers of the various valves to effect these regeneration steps. The relative positions of the rotor and stator corresponding to these steps of the cycle are shown in Figs. 13 through 17.

Assuming that the rotor shown in Fig. 13 is superimposed on the stator of Fig. 10 and the rotor adjusted to the service position, the relative angular position of the rotor with respect to the stator of Fig. 10 is shown in Fig. 13, and the ports 275 and 262 of the rotor and stator will be in communication so that pressure fluid will enter the control valve through the channel 271 and constantly maintain pressure within the chamber 255, the fluid flowing through the ports 275 and 262 and to the diaphragm chamber 69 of the main valve by way of the tube 72 so as to maintain the stem 91 in the position shown in Fig. 3. Likewise the ports 283 and 269 of the rotor and stator are in communication, and fluid flows through the tube 73 to the diaphragm chamber 71 of the main valve maintaining the stem 113 in the position shown in Fig. 3 corresponding to the service position of the valve as heretofore described. Also pressure fluid flows through the ports 279 and 264 of the rotor and stator and through the tube 183 to the diaphragm chamber 182 of the fast rinse valve 36 maintaining this valve in the closed position as shown in Fig. 5. It will be seen that in Figs. 13 to 17 the shaded ports indicate the open ports in the respective positions of the rotor. Likewise it will be noted that the ports 286 and 263 are in communication, thus establishing communication between the drain tube 267 and the tube 141 relieving pressure in the diaphragm chamber 139 of the main valve and allowing the stem 134 to move to the open position as shown in Fig. 4. When the meter disk 205 has moved from the position shown in Fig. 7 in a clockwise position until the cam 209 closes or actuates the switch 213, the motor 218 is energized as heretofore described, moving the control valve rotor to the position shown in Fig. 14. This movement of the meter constitutes a measurement of the normal capacity of the treatment tank 22 and is adjusted upon installation to operate the switch 13 upon the passage of an amount of water substantially corresponding to this capacity and to thereby start the regeneration cycle.

As the rotor is moved into the position shown in Fig. 14, the drain port 286 comes into communication with the port 262 of the stator connected to the diaphragm chamber 69 and allows the pressure of the fluid in the valve to move the stem 91 to the left as heretofore described so as to direct the raw water to the bottom of the softener. The ports 279 and 263 of the rotor and stator come into communication and pressure is consequently applied through the tube 141 to diaphragm chamber 139, closing the valve to the service line. Also the ports 277 and 264 of the rotor and stator come into registration, again applying pressure through the tube 133 to the diaphragm chamber of the fast rinse valve 36 maintaining this valve in the closed position. Also ports 282 and 269 of the rotor and stator come into communication to maintain the pressure through the tube 73 to the diaphragm chamber 71 to maintain the valve stem 113 in the position shown in Fig. 3 and thereby maintain the ports 107 and 108 in open and closed position, respectively, during the back-wash operation, as heretofore described. The flow of raw water through the treatment tank during the back-wash operation causes movement of the meter disk 205, the duration of the back-wash step being measured by the time required for the cam 209 to move from the switch 213 to the switch 214. When the switch 214 is closed, the motor 218 is energized to move the control valve rotor to the reagent position shown in Fig. 15. As the rotor moves into the reagent position, the ports 279 and 262 of the rotor and stator come into communication to apply pressure to the diaphragm chamber 69 and return the valve stem 91 to the position shown in Fig. 3. Simultaneously the drain port 285 and the port 269 of the stator come into registration to relieve pressure in the diaphragm chamber 71, thus permitting the liquid within the valve to move the stem 113 to the position opposite that shown in Fig. 3, thereby closing the port 107 to start the injector. The ports 277 and 263 of the rotor and stator come into communication to retain pressure in the diaphragm chamber 139 of the main valve, and thus retain the conduit to service in the closed condition. Likewise, the ports 276 and 264 come into registration to maintain pressure on the diaphragm chamber 182 of the fast rinse valve 36. In this position of the control valve the reagent valve 35 is opened by action of the spring 167 moving the stem to the open position to start the regeneration cycle, the injector acting to relieve the pressure in the diaphragm chamber 155 as heretofore described. This draws reagent from the tank 23 causing the level thereof to fall until the switch 239 is actuated to start the motor 218 and move the rotor to the next position, thus terminating the regeneration step and starting the rinse.

As the rotor moves to the wash, rinse, or rinsing position shown in Fig. 16, ports 277 and 262 of the rotor and stator come into communication to retain pressure in diaphragm chamber 69 of the main valve and retain the valve stem 91 in the position shown in Fig. 3. Likewise, ports 276 and 263 retain pressure in the chamber 139 to maintain the service line closed, and ports 275 and 264 come into registration to maintain pressure in the diaphragm chamber 182 of the fast rinse valve. In this position of the rotor, ports 281 and 265 come into communication to apply pressure by way of tube 168 to the diaphragm chamber 155 of the reagent valve, moving this valve to the closed position and thus terminating the flow of reagent to the injector. Rinse water continues to flow through the treatment tank through the nozzle 128 at a reduced rate so as to gradually displace the reagent from the tank and slowly effect a rinsing operation which I have herein designated as the slow or first rinse. In this position of the valve raw water flows through the treatment tank, causing the meter disk 205 to be moved forward until the cam member 209 actuates the switch 215.

However, in order to accurately measure the duration of the rinse step, means are provided for resetting the position of the disk 205 with respect to the meter driving mechanism and with respect to the switch 215. This includes a cam face 293 carried on the yoke 241 and rotated by the motor 218, the cam being positioned so that simultaneously with the rotation of the rotor to the rinse position shown in Fig. 16, the cam face 293 engages the pin 208 to move the disk forward slightly to a predetermined starting position for the measurement of the rinse interval, the friction elements 203 and 204 permitting this relative movement of the disk 205 with respect to the shaft 202. When the disk 205 is moved to a position to close the switch 215, the motor acts to index the shaft 219 and the rotor through 72° to the next position, which I have termed the fast or second rinse position, the position of the rotor being shown in Fig. 17.

As the rotor moves to the position of Fig. 17, drain port 286 comes into communication with port 264 of the stator, relieving pressure from the diaphragm chamber 182 of valve 36 by way of the tube 183, whereby the pressure of the water within the valve causes movement of the valve to the open position and consequently a flow of raw water through conduits 38 and 39 to the suction side of the injector, and also permitting the flow of water through the conduit 41 and valve 42 to the reagent tank 23. Also the ports 278 and 265 of the rotor and stator come into communication to maintain pressure in the diaphragm chamber 155 of the reagent valve, the ports 276 and 262 come into registration to retain pressure in the diaphragm chamber 69 of the main valve, and ports 275 and 263 come into communication to retain pressure on the diaphragm chamber 139 and thus prevent flow through the service conduit. Thus in this step, rinse water flows to the treatment tank through nozzle 128 and through pipe connection 126 so that the combined flow functions to give an accelerated rinse as a final stage in the reconditioning operation to complete the operation of clearing the tank of regeneration reagent. This increase in flow causes a better distribution of the flow over the full surface area and down through the zeolite bed and so washes out the hard spots or islands of reagent with greater rapidity. This fast or second or accelerated rinse also acts to compress the whole bed and give a better distribution of the flow during the final stages of the rinse. The duration of the second rinse step is measured by the time required for sufficient water to flow through the restriction valve 42 to refill the reagent tank and thus cause closing of the switch 244 (Fig. 18). Upon closing of the switch 244, the motor 218 is again energized, shifting the rotor back to the position shown in Fig. 13 which acts to move the various hydraulic valves to the service position as heretofore described, thus completing the cycle of regeneration and return to service.

Simultaneously with movement of the rotor from the position of Fig. 17 to that of Fig. 13, the meter disk 205 is reset. This is accomplished by means of a cam face 299, in this instance positioned on the yoke 247 and driven by the motor 218, the cam face 299 being disposed to engage the pin 207 during movement of the shaft through the last 72° step so as to move the disk 205 forward to a predetermined starting position for the service interval.

Referring now to Fig. 18, I have therein shown an improved form of float control for the reagent tank, though it will be obvious that other suitable types of control may be substituted therefor in the general combination. This control suitably includes a bracket 301 attached to the side of the reagent tank 23 and carrying a housing 302 in the general form of an inverted cup, this housing forming an enclosure for the operating mechanism. Attached across the bottom of the housing is a bottom plate 303 which is dished upwardly as shown in Fig. 18 and carries an upwardly disposed bracket 304, which bracket projects outwardly as shown at 305 at its upper end to provide a guide for a stem 306. The switches 244 and 239 are carried on the bracket 304 in spaced relation so that the plungers thereof may be engaged by a flange 307 attached to the stem 306. The plate 303 has an opening for the passage of the stem 306 also serving as a guide therefor, and has an opening 308 for the passage of air to prevent the device from becoming air-locked. Attached across the bottom of the plate 303 is a flexible diaphragm 309 which is substantially impervious to moisture and serves to seal the lower end of the housing, the diaphragm being secured in position by a ring 311 and screws 312 which act to hold the plate 303, the diaphragm and the ring in assembled relationship on the housing. A spring 313 is disposed around the stem 306 and acts between the collar 314 and the end 305 of the bracket and normally urges the stem upwardly. The lower end of the stem is secured in clamping members 315 which pass through the diaphragm and clamp thereto as shown in Fig. 18, these clamping members also carrying a depending rod 316 having a collar 317 at its lower end, the rod projecting downwardly into the reagent tank and carrying a ball float 318 adapted to slide up and down on the rod 316 in response to change in the level of the liquid in the tank. The weight of the ball 318 and associated parts is so balanced against the compression of the spring 313 that when the ball contacts the collar 317 corresponding to a low level of liquid in the tank 23, its weight is sufficient to move the flange 307 downwardly to contact the switch 239, and when the level of the liquid in the tank rises so that the ball floats upwardly, the spring, together with the buoyancy of the ball, acts to raise the flange 307 to actuate or close the starting switch 244. In other words, in effect, the spring 313 acts in a counterbalancing capacity.

It will be seen that the device heretofore described constitutes an entirely automatic water treatment device in which each step of the regeneration cycle is controlled without manual operation. However, the regeneration cycle can be arranged for manual control by changing the control valve as shown in Figs. 19 and 20 and eliminating from the device the control mechanism shown in the wiring diagram of Fig. 2, together with associated mechanism. For this purpose a bracket 319 is employed to replace the brackets 256 and 261 of Fig. 7, the bracket 319 having an arm 321 projecting outwardly for attachment thereof to a suitable stationary means of support to support the control valve. The bracket also has an arm 322 comparable to the arm 256 of Fig. 9 having an inwardly disposed end portion 323 serving as a support and guide for the stem 249 of the control valve. The end 323 also carries an index plate 324 having notches as indicated at 325 for locating the various positions of the control valve rotor. A handle 326 is attached to the end of the stem 249 and carries a latch 327 pivoted thereon adapted for engagement in the notches 325, as will be seen from Figs. 19 and 20, to locate the stem 249, a spring 328 normally urging the latch inwardly toward engaged position with the notches. It will be seen that by means of the handle 326 the rotor may be manually rotated between its various positions, as heretofore described, to effectuate the regeneration cycle of the device.

The foregoing description and the accompanying drawings show a preferred embodiment of the invention by way of illustration rather than limitation, and I do not wish to be limited except as required by the scope of the appended claims, in which I claim:

1. The combination in a water treatment apparatus of a treatment tank, a reagent tank, a conduit system connected to said tanks including conduits for raw water, treated water, regeneration reagent, and waste, a first valve means in said conduit system movable for controlling the flow of liquid through said conduits to effect the steps of back-washing, regenerating, rinsing and service, a second valve means in said conduit system connected to the first valve means for supplying to said first valve means an additional flow of water toward the end of said rinse step, said second valve means also being connected to said reagent tank to simultaneously provide a flow of water thereto, and operating means for moving said first valve means from said rinse step to said service step and for closing said second valve means when said reagent tank is filled to a predetermined level.

2. A water treatment apparatus comprising, in combination, a water treatment tank, a reagent tank, a multiple port valve, conduits for raw water, treated water, reagent and waste connected to said valve, conduits connecting said valve with the upper and lower ends of said water treatment tank, said valve having an injector for drawing reagent from said reagent tank and injecting brine into said treatment tank, a diaphragm valve in said reagent conduit arranged to be opened by reduced pressure in said reagent conduit produced by said injector, a three-way valve connected to said raw water conduit, said reagent tank and said multiple port valve to supply rinse water to said treatment tank at an accelerated rate and simultaneously refill said reagent tank, and operating means including a meter in said raw water conduit for controlling said valves to effect the steps of regeneration and return to service.

3. The combination in a water treatment apparatus of a treatment tank, a regeneration reagent tank, conduits for raw water, treated water and waste, valve means for controlling the flow through said treating tank movable between service, back-wash, regenerating and rinse positions to effect a regeneration cycle, operating means for moving said valve means between said positions said valve means including an injector, and means for supplying injection water thereto, a conduit for conducting reagent from said regeneration tank to the suction side of said injector for delivery to said treatment tank, means for termination of the flow of reagent through said reagent conduit when the level of reagent in said reagent tank reaches a predetermined lower level, valve means connected to the intake side of said injector to a source of water and to said reagent tank to simultaneously provide a flow of rinse water to said injector for an accelerated rinse and to said reagent tank to refill the same, said operating means including means for closing the last mentioned valve means and for moving the first mentioned valve means to service position when the level of liquid in said reagent tank reaches a predetermined upper level.

4. Water treatment apparatus comprising in combination a water treatment tank, a reagent tank, a conduit system connected to said tank and including conduits for raw water, service water, reagent and waste, hydraulic valve means for controlling the liquid flow through said tanks, and control means for said valve means to effect the regeneration steps of back-washing, introduction of reagent, rinsing and return to service, said control means comprising a control valve connected to said valve means movable through a succession of positions to control the application of fluid pressure to said valve means and move the same through said steps, electrical switches and switch circuits, a motor included in said circuits for driving said control valve in step fashion from one of said positions to the next in response to closing of separate switches, a meter in said raw water conduit, said switches being positioned to be actuated by said meter to move said hydraulic valve means from said service to said backwash step and from said back-wash step to the introduction of reagent step, and switches positioned to be actuated by the reagent in said reagent tank upon change in level thereof for moving said hydraulic valve means from said reagent step to a rinse step and from a rinse step to said service step.

5. Water treatment apparatus comprising in combination a water treatment tank, a source of regeneration liquid, a conduit system connected to said tank and said source including conduits for raw water, service water, regeneration liquid and waste, valve means for controlling the flow through said tank and conduits through steps of regeneration and return to service, means for driving said valve means to effect the steps of regeneration and return to service, control means for said driving means including a control valve connected to said driving means for directly controlling said driving means, a motor for driving said control valve, a meter disposed in said raw water conduit and responsive to the flow therethrough, an actuator driven by said meter and forming the indicating elements thereof, switch and circuit means for controlling said motor disposed to be actuated by said actuator at predetermined points in its travel to effect movement of said valve means from a service to a back-wash position to terminate a service period, and from said back-wash position to a regeneration position to terminate a back-wash period, means for controlling said motor to move said valve means from said regeneration position to a rinse position and resetting said actuator to a predetermined position to measure the duration of a rinse period, and means for controlling said motor to return said valve means to the service position and for resetting said actuator to a predetermined position.

6. Water treatment apparatus comprising in combination a water treatment tank, a tank for regeneration reagent, a conduit system connected to said tanks including conduits for raw water, service water, regeneration reagent and waste, valve means for controlling the flow through said tanks and conduits, means for driving said valve means to effect the steps of regeneration and return to service, control means for said driving means including a control valve for directly controlling said driving means, a motor for driving said control valve, a meter disposed in the raw water conduit, an actuator driven by said meter, switch means for controlling said motor disposed to be actuated by said actuator at predetermined points in its travel to effect movement of said valve means from a service to a back-wash position to terminate a service period, from said back-wash position to a regeneration position to terminate a back-wash period, and from one rinse position to a second rinse position to terminate a slow rinse period and initiate a fast rinse period and to refill the regeneration reagent tank, switch means responsive to the reagent upon change in level of the surface thereof in said reagent tank for moving said valve means from said regeneration position to a slow rinse position to initiate a slow rinse period, switch means responsive to the level of reagent in said reagent tank to move said valve means to the service position to initiate a service period and to terminate refilling of said reagent tank, and means driven by said motor for resetting said actuator to a predetermined position at the start of said slow rinse and said service periods for meter measurement thereof.

7. Water treatment apparatus comprising in combination, a water treatment tank, a reagent tank, a conduit system connected to said tanks including conduits for raw water, service water, reagent and waste, a plurality of diaphragm valves for controlling the flow through said conduits, and control means for said valves to effect the regeneration steps of back-washing, introduction of reagent, rinsing, refilling said reagent tank, and return to service, said control means comprising a control valve including a ported stator and a porter rotor said stator and rotor having ports positioned to come into registration in a plurality of different combinations upon rotation of said rotor to successive positions to control the flow of pressure fluid to and from said valves for movement thereof to effect said steps, an electric circuit, an electric motor in said circuit arranged to move said rotor from one position to a successive position in step fashion upon the closing of said circuit, a meter disposed in said raw water conduit having an actuator, and means for driving said actuator from said meter through about 360° in response to the passage of water during one complete service and regeneration cycle, switches positioned to be operated by said actuator at predetermined points in its rotation to energize said motor at the end of said service and back-wash steps as measured by the volume of water passing through said meter, switches associated with said reagent tank, and means for operating one of said reagent tank switches at a predetermined lower level of liquid in the reagent tank to energize the motor to terminate the introduction of reagent step and for operating another of said reagent tank switches at a predetermined upper level of liquid in said reagent tank to energize the motor and terminate a rinse step and start the service step.

8. Water treatment apparatus comprising, in combination a water treatment tank, a reagent tank, a conduit system connected to said tanks including conduits for raw water, service water, reagent and waste, a plurality of diaphragm valves for controlling the flow through said conduits, and control means for said valves to effect the regeneration steps of back-washing, introduction of reagent, slow rinsing, fast rinsing and refilling said reagent tank, and return to service, said control means comprising a control valve connected to a source of fluid pressure including a ported stator and a ported rotor arranged to establish communication with said stator in a plurality of different combinations upon rotation of said rotor between positions corresponding with said steps to control the flow of pressure fluid to and from said valves for movement thereof to effect said steps, an electric circuit, an electric motor unit in said circuit arranged to move said rotor from one position to a successive position in step fashion upon the closing of said circuit, a meter disposed in said raw water conduit having an actuator, and means for driving said actuator through about 360° in response to the passage of water during one complete service and regeneration cycle, switches positioned to be operated by said actuator at predetermined points in its rotation to energize said motor at the end of said service, said back-wash, and said slow rinse steps as measured by the volume of water passing through said meter tank, switches associated with said reagent tank, means for operating one of said reagent tank switches at a predetermined lower level of liquid in the reagent tank to energize the motor to terminate the introduction of reagent step and start said slow rinse step, and for operating another of said reagent tank switches at a predetermined upper level of liquid in said reagent tank to energize the motor to terminate said fast rinse step and start said service step, and cam means driven by said motor for resetting said actuator upon the start of said slow rinse and said service steps.

9. Water treating apparatus comprising in combination a treating container having a bed of water treating material, a regeneration reagent tank, piping connecting said tank with said container, an injector operatively associated with said piping for drawing solution from said tank and injecting it into said container, water supply means connected with said injector for operating the same, and a normally closed diaphragm valve associated with said tank and piping to control the flow of regeneration reagent, said diaphragm valve having passage means establishing communication between one face of said diaphragm valve and said piping, whereby said diaphragm valve is opened by the pressure exerted on the other side thereof in consequence of suction created in said pipe by said injector to allow withdrawal of reagent from said tank, and a control valve for effecting closing of said diaphragm valve by applying a larger volume of pressure fluid thereto than can be relieved by the passage into said pipe.

10. Water treating apparatus comprising in combination a container having a bed of water treating material, a tank containing a regeneration reagent, piping connecting said tank with said container, an injector operatively associated with said pipe for drawing reagent from said tank and injecting it into said container, water supply means connected with said injector for operating the same, and a diaphragm valve associated with said tank and piping to control the flow of reagent, said diaphragm valve having means exerting a pressure for opening it and a diaphragm chamber having a passageway and a conduit connected thereto, a control valve connected to said conduit to apply fluid pressure thereto for closing said diaphragm valve and said diaphragm valve having another passageway establishing communication between said diaphragm chamber and said piping, whereby said diaphragm valve will open in consequence of suction created in said piping by said injector and allow withdrawal of solution from said tank.

11. The combination in a water softener of a softener tank, brine tank, a conduit system connected to said softener tank including conduits for raw water, service water, and waste, a raw water conduit to said brine tank and a conduit therefrom connected to said softener tank, valve means for controlling and directing the different flows through the steps of regeneration and return to service, an electric motor for controlling said valve means, a plurality of circuits to said motor each having a starting switch spring pressed to open position arranged to start said motor, and a stopping switch spring compressed to closed position adapted to open by spring pressure to stop said motor, cam means driven by said motor for closing and releasing said stopping switches successively and progressively, a meter in said raw water conduit, means responsive to a flow of water through said meter and to a low and a high level of the liquid in said brine tank, and means for closing said starting switches successively in response to said meter and to said low and high levels of said liquid in the brine tank during the regeneration and service steps.

12. The combination in a water treatment apparatus of a water treatment tank, a conduit system connected to said tank including a regeneration reagent tank, conduits for raw water, service water, reagent and waste, valve means for controlling the flow therethrough through steps of regeneration and return to service, said valve means having three reciprocable stems, and valve ports controlled by said stems upon movement thereof longitudinally between opposed positions, a diaphragm associated with each of said stems, each of said diaphragms being exposed at one side to the fluid within said valve for moving said stems to one position, and diaphragm chambers on the opposite sides thereof for reception of pressure fluid to move said stems to the other position, a source of fluid pressure, a control valve for supplying and releasing pressure fluid from said chambers to control the flow through said valve means, said control valve comprising a stator, a rotor disposed thereagainst, a housing having a fluid pressure supply chamber enclosing said rotor, and means for rotating said rotor through a succession of positions to control regeneration of said water treatment apparatus, said stator having three circumferentially spaced ports, each connected to one of said diaphragm chambers, and said rotor having ports therein spaced and arranged with respect to the stator ports to supply pressure fluid from said pressure chamber through two of the three stator ports in each position of the rotor to hold the corresponding valve stems in said other positions and to prevent the supply of fluid pressure through one of the three stator ports in each position of the rotor for movement of the corresponding stem to the first mentioned position.

13. The combination in a water treatment apparatus of a water treatment tank, a conduit system connected to said tank including a regeneration reagent tank, conduits for raw water, service water, reagent and waste, valve means for controlling the flow therethrough through steps of regeneration and return to service, said valve means including a main valve having three reciprocable stems, and valve ports controlled by said stems upon movement thereof longitudinally between opposed positions, a reagent valve having a reciprocable stem for controlling the flow therethrough, a fast rinse valve for controlling the flow of rinse water to said main valve and refill water to said reagent tank, diaphragms associated with each of said stems, said diaphragms being exposed at one side to the fluid within said valves for moving said stems to one position, and diaphragm chambers on the opposite sides thereof for reception of pressure fluid to move said stems to the other position, a source of fluid pressure, a control valve for supplying and releasing fluid pressure from said chambers to control flow through said valve means, said control valve comprising a stator, a rotor disposed thereagainst, a housing having a fluid pressure supply chamber enclosing said rotor, and means for rotating said rotor through a succession of positions to effect movement of said valve means through a regeneration cycle and return to a service position, said stator having four ports circumferentially spaced on a uniform radius, two of said ports being connected to two of the diaphragm chambers of said main valve, another of said ports being connected to the diaphragm chamber of said fast rinse valve, and the other of said ports being connected to the diaphragm chamber of said reagent valve, said stator also having a port disposed on a lesser radius than the first mentioned stator ports and connected to the third diaphragm chamber of said main valve, said stator also having a centrally disposed drain port, said rotor having ports therein spaced and arranged with respect to the first mentioned group of stator ports to supply pressure fluid from said pressure chamber through two of the three stator ports connected to said main valve in each position of the rotor so as to hold the corresponding valve stems in said other positions and to prevent the supply of fluid pressure through one of the three stator ports connected to the main valve for movement of the corresponding stem to said first mentioned position, said rotor also having ports for supplying pressure fluid to the diaphragm chamber of said fast rinse valve by way of the corresponding stator port in all positions of the control valve except one and for supplying pressure fluid to the diaphragm chamber of the reagent valve in two positions of said control valve.

14. The combination in a water treatment apparatus of a treatment tank, a conduit system connected to said tank including conduits for raw water, treated water, and waste, valve means for controlling the different flows through said treatment tank comprising a multiple port valve having an end chamber connected to one end of said treatment tank, an intermediate chamber, an inlet chamber connected to said raw water conduit and an outlet chamber connected to said treated water conduit and to the other end of said treatment tank, coaxial ports connecting said end chamber to said waste conduit, said intermediate chamber to said outlet chamber and said intermediate chamber to said end chamber, a valve stem axially disposed with respect to said ports, valve disks on said stem positioned in one position of said stem to simultaneously close said waste port and said port between the intermediate chamber and said outlet chamber to pass liquid from said intermediate chamber to the treatment tank and in another position of said stem to open said waste port and said port connecting the intermediate chamber and the outlet chamber and simultaneously close the port between said intermediate chamber and said end chamber, to pass liquid from said intermediate chamber to said outlet chamber and to the opposite end of said treatment tank and from the first mentioned end of said treatment tank through said end chamber and waste port to back-wash said tank, and means for moving said stem longitudinally between said positions.

15. The combination in a water treatment apparatus of a treatment tank, a conduit system connected to said tank including a regeneration reagent tank, conduits for raw water, treated water, reagent and waste, and valve means for controlling the different flows through and from said treatment tank comprising a multiple port valve having an end chamber connected to one end of said treatment tank, an intermediate chamber, an inlet chamber connected to said raw water conduit, and an outlet chamber connected to said treated water conduit and to the other end of said treatment tank, coaxial ports connecting said end chamber to said waste conduit, said end chamber to said intermediate chamber and said intermediate chamber to said outlet chamber, a valve stem axially disposed with respect to said ports, valve disks on said stem positioned in a first position of said stem to simultaneously close said waste port and said port between the intermediate chamber and the outlet chamber to pass liquid from said intermediate chamber to the treating tank, and in a second position of said stem to open said waste port and said port connecting the intermediate chamber and the outlet chamber to pass liquid from said intermediate chamber to said outlet chamber and to the opposite end of said treatment tank, and from the first mentioned end of the treatment tank through said end chamber and waste port to back-wash said tank, a second series of coaxially disposed ports connecting said inlet chamber to said intermediate chamber and said outlet chamber to said waste conduit, a second stem axially disposed with respect to said second series of ports, valve disks on said second stem positioned in a first position of said stem to close the port between said outlet chamber and waste conduit and open said port between said inlet chamber and said intermediate chamber and in a second position to open said outlet to waste port and close said inlet to intermediate chamber port, and control means for moving said valve stems between said positions to effect a succession of different port combinations to control the different liquid flows through and from said treatment tank.

16. The combination in a water treatment apparatus of a treatment tank, a conduit system connected to said tank including a regeneration reagent tank, conduits for raw water, treated water, reagent and waste, and valve means for controlling the flow therethrough comprises a multiple port valve having an end chamber connected to one end of said treatment tank, an intermediate chamber, an inlet chamber connected to said raw water conduit, and an outlet chamber connected to the other end of said treatment tank and having an outlet port to said treated water conduit, coaxial ports connecting said end chamber to said waste conduit, said end chamber to said intermediate chamber and said intermediate chamber to said outlet chamber, a valve stem axially disposed with respect to said coaxial ports, valve disks on said stem positioned in a first position of said stem to simultaneously close said waste port and said port between the intermediate chamber and the outlet chamber to pass liquid from said intermediate chamber to the treating tank, and in a second position of said stem to open said waste port and said port connecting the intermediate chamber and the outlet chamber to pass liquid from said intermediate chamber to said outlet chamber and to the opposite end of said treatment tank, and from the first mentioned end of the treatment tank through said end chamber and waste port to backwash said tank, a second series of coaxially disposed ports connecting said inlet chamber to said intermediate chamber and said outlet chamber to said waste conduit, a second stem axially disposed with respect to said second series of ports, valve disks on said second stem positioned in a first position of said stem to close the port between said outlet chamber and waste conduit and open said port between said inlet chamber and said intermediate chamber and in a second position to open said outlet to waste port and close said inlet to intermediate chamber port, a third valve stem coaxial with said outlet port, a valve disk on the last mentioned stem cooperable with said outlet port upon movement of said stem to control flow therethrough, and control means for moving said valve stems between said positions to effect a succession of different port combinations to control the flow through said treatment tank.

17. The combination in a water treatment apparatus of a treatment tank, a conduit system connected to said tank including a regeneration reagent tank, conduits for raw water, treated water, reagent and waste, and valve means for controlling the different liquid flows through said treatment tank comprising a multiple port valve having an end chamber connected to one end of said treatment tank, an intermediate chamber, an inlet chamber connected to said raw water conduit, and an outlet chamber connected to said treated water conduit and to the other end of said treatment tank, coaxial ports connecting said end chamber to said waste conduit, said end chamber to said intermediate chamber and said intermediate chamber to said outlet chamber, a valve stem axially disposed with respect to said ports, valve disks on said stem positioned in a first position of said stem to simultaneously close said waste port and said port between the intermediate chamber and the outlet chamber to pass liquid from said intermediate chamber to the treating tank, and in a second position of said stem to open said waste port and said port connecting the intermediate chamber and the outlet chamber to pass liquid from said intermediate chamber to said outlet chamber and to the opposite end of said treatment tank, and from the first mentioned end of the treatment tank through said end chamber and waste port to back-wash said tank, a second series of coaxially disposed ports connecting said inlet chamber to said intermediate chamber and said outlet chamber to said waste conduit, a second stem axially disposed with respect to said second series of ports, valve disks on said second stem positioned in a first position of said stem to close the port between said outlet chamber and waste conduit and open said port between said inlet chamber and said intermediate chamber and in a second position to open said outlet to waste port and close said inlet to intermediate chamber port, an injector connecting said inlet chamber and said intermediate chamber providing a flow of raw water from the former to the latter in all positions of the valve stems, said injector also being connected to said reagent conduit, and means for moving the first mentioned stem from said first position to said second position and retaining said second mentioned stem in the first position thereof to back-wash said treatment tank, for subsequently moving the first stem back to the first position thereof and the second stem to the second position thereof to introduce regeneration reagent into said treatment tank, and for thereafter moving the second stem to the first position thereof to return said second valve stem to the first mentioned position thereof for water treatment operation of said treatment tank.

18. Water softening apparatus comprising a softener tank, a brine tank, a fluid pressure operated valve means, a source of fluid pressure therefor, a raw water supply pipe, a service pipe for softened water and a waste pipe connected to said valve means, piping connecting said valve means with said softener tank and brine tank, said valve means having a plurality of individual valve ports and cooperating passageways, two valve stems having multiple valve members thereon for opening and closing their respective valve ports, said valve members having resilient rubber disks for sealing said valve ports, said valve stems each controlling a valve port to said waste pipe, and valve ports within said unit to control a cycle of three successive flows, namely, to control a flow of raw water through said valve means from said supply pipe to the top of said softener tank and from said softener tank to said service pipe during normal softening operation, to control the flow of raw water from said supply pipe to the bottom of said softener tank and from said softener tank to said drain pipe during backwashing, and to control a flow of raw water from said supply to the top of said softener tank and from said softener tank to said drain pipe during brining and rinsing, and means for controlling fluid pressure on said valve means for successively moving said valve stems to control the flow through said ports.

19. In a water softening apparatus comprising a softener tank, a brine tank, a fluid distribution unit, a raw water supply pipe, a service pipe for softened water and a drain pipe connected to said fluid distribution unit, piping connecting said fluid distribution unit with said softener tank and brine tank, respectively, said fluid distribution unit having a plurality of individual valve ports and cooperating passageways, two valve stems having multiple valve members thereon for opening and closing their respective valve ports, said valve members having resilient rubber disks for sealing said valve ports, said valve stems each controlling a valve port to said drain pipe and valve ports within said unit to give a combination of open valve ports for controlling a cycle of three successive flows, to give open valve ports between said supply pipe, said softener tank and said service pipe during normal softening, to give open valve ports between said supply pipe, said softener tank and said drain pipe during backwashing, and to give open valve ports between said supply pipe, said softening tank and said drain pipe during brining and rinsing, and means for successively moving said valve stems to control the flow through said ports.

20. In a water softening apparatus comprising a softener tank, a regeneration reagent tank, a multiple port valve, a raw water supply pipe, a service pipe for softened water and a drain pipe connected to said valve, piping connecting said valve with said softener tank and reagent tank respectively, said valve having a plurality of individual valve ports and cooperating passageways, two valve stems having multiple valve members thereon for opening and closing their respective valve ports, said valve members having resilient rubber disks for sealing said valve ports, said valve stems each controlling a valve port to said drain pipe and valve ports within said valve to control a flow from said supply through said softener tank to said service pipe when both of said valve stems have closed their valve ports to drain during normal softening, to control a flow from said service pipe through said softener tank to drain when one of said stems has opened its valve port to drain during back-washing, and to control a flow from said supply pipe through said softener tank to said drain pipe when the other of said valve stems has opened its port to drain, and means for moving said valve stems to control the flow through said ports.

21. The combination in a water treatment apparatus, of a treatment tank, a reagent tank for regeneration solution, a piping system connected to said treatment tank and including pipes for a water supply, treated water, a pipe from said reagent tank to said treatment tank, a pipe from said water supply pipe to said reagent tank, and a pipe to drain, valve means connected in said pipes for controlling the flows of liquid to and from said tanks through the operations of water treatment, backwashing, and regenerating and rinsing operations to effect a regeneration cycle, said rinsing operations comprising a first rinsing operation and a second rinsing operation, the latter at an accelerated rate of flow through the treating tank with respect to the first rinsing operation, and control means for said valve means including a meter in said water supply pipe, means responsive to said meter for terminating the service operation and starting the backwash operation and further responsive to said meter for terminating the backwash operation and starting said regenerating operation, said control means including a float control having a float and means operated by the float when the float reaches a predetermined low level in the reagent solution tank for terminating the reagent solution operation and starting said first rinsing operation, meter responsive means for terminating said first rinsing operation and starting said second rinsing operation, means for refilling the reagent tank, and said float control having means operated by the float when the float reaches a predetermined high level in the reagent tank for terminating said second rinsing operation and returning to said service operation.

22. A water treating apparatus having a treating tank, a reagent tank, pipes connected to said tanks, including a water supply pipe, a service pipe, a reagent pipe, a waste pipe and a pipe from said water supply to said reagent tank, a fluid meter in said water supply pipe, valve means in said pipes to control the fluid flows to and from said treating tank and flow to and from said reagent tank, control means in said reagent tank, means operated by said meter to terminate a service flow from said treating tank and start a backwash flow therethrough to waste, and to terminate the backwash flow and start a reagent flow from said reagent tank, said control means having means operated in response to a predetermined low level in said reagent tank to operate said valve means to terminate the reagent flow and start a slow rinsing flow, said meter terminating the slow rinsing flow and starting an accelerated rinsing flow, and said control means having means operated in response to a predetermined high level in said reagent tank to operate said valve means to terminate the accelerated rinsing flow and start the service flow.

23. Water softening apparatus comprising: a softener tank, a brine tank, a pipe system connected to said softener tank including a hard water supply pipe, a soft water service pipe, a pipe to waste, a brine pipe from said brine tank, and a pipe from said hard water supply to said brine tank; power operated valve means arranged in said pipes; an injector associated with said valve means, said injector arranged to be operated by said valve means to control the operation of said valve means and to draw liquid from said brine tank, a meter in said hard water supply pipe operated by the flow of water to said softener tank, said meter arranged when predetermined amounts of water have been metered, to operate said valve means in response to said predetermined amounts respectively, to terminate the softening, to start and to terminate the backwashing and start the brining; and means for rinsing at a first rinsing rate and at a second accelerated rate, including a level operating control means in said brine tank arranged to operate said valve control means in response to a low and a high level of the liquid in said brine tank, said level operating means arranged when the liquid is drawn down to a predetermined low level in said brine tank to thereupon operate said valve means to terminate the brining and start the rinsing at said first rinsing rate, and said meter operating in response to flow of a predetermined amount of water therethrough to terminate the first rinsing and start the second rinsing at said accelerated rate, and said level operating control means operating in response to the filling of said brine tank to a predetermined level to thereupon terminate the second rinsing and start the softening.

24. The combination in a water treating apparatus of a water treating tank, a reagent tank, a conduit system connected to said water treating tank including conduits for raw water, service water, and waste, a raw water conduit to said reagent tank and a conduit from said reagent tank connected to said water treating tank, valve means in said conduits for controlling and directing the different flows through the steps of regeneration and return to service, an electric motor for controlling said valve means, a plurality of circuits to said motor each having a starting switch spring pressed to an open position arranged to start said motor, and a stopping switch spring compressed to a closed position adapted to open by spring pressure to stop said motor, cam means driven by said motor for closing and releasing said stopping switches successively and progressively, a meter in said raw water conduit, and means operated by said meter for closing said starting switches successively in response to the water flowing through said meter.

25. The combination in a water treating apparatus of a water treating tank, a reagent tank, a conduit system connected to said water treating tank including conduits for raw water, service water, and waste, a raw water conduit to said reagent tank and a conduit from said reagent tank connected to said water treating tank, valve means in said conduits for controlling and directing the different flows through the steps of regeneration and return to service, an electric motor for controlling said valve means, a plurality of circuits to said motor each having a starting switch spring pressed to an open position arranged to start said motor, and a stopping switch spring compressed to a closed position adapted to open by spring pressure to stop said motor, cam means driven by said motor for closing and releasing said stopping switches successively and progressively, a flow control means for controlling the flow of water with respect to said softener tank, and means operated by said flow control means for closing said starting switches successively in response to the different flows of water.

26. Water treating apparatus comprising a water treating tank, a reagent tank, a piping system connected to said treating tank including pipes for a water supply, service water, and waste, a water supply pipe to said reagent tank and a pipe from said reagent tank connected to said treating tank, valve means connected in said pipes for controlling and directing the different flows through the operations of treating, backwashing, reagenting, rinsing, and return to the treating operation; an electric motor for controlling said valve means; a plurality of circuits to said motor each having a starting switch spring pressed to an open position arranged to start said motor when closed, and a stopping switch spring compressed to a closed position arranged to open by spring pressure to stop said motor; cam means driven by said motor for closing and releasing said stopping switches successively and progressively; a meter in said water supply pipe; and means controlled by said meter for closing said starting switches at the end of each of said operations.

LEE G. DANIELS.